(12) United States Patent
Miyasaka

(10) Patent No.: US 9,714,325 B2
(45) Date of Patent: Jul. 25, 2017

(54) METHOD FOR PRODUCING RUBBER WET MASTERBATCH, RUBBER WET MASTERBATCH, AND RUBBER COMPOSITION INCLUDING RUBBER WET MASTERBATCH

(71) Applicant: TOYO TIRE & RUBBER CO., LTD., Osaka-shi, Osaka (JP)

(72) Inventor: Takashi Miyasaka, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 420 days.

(21) Appl. No.: 14/350,309

(22) PCT Filed: Sep. 18, 2012

(86) PCT No.: PCT/JP2012/073832
§ 371 (c)(1),
(2) Date: Apr. 7, 2014

(87) PCT Pub. No.: WO2013/108436
PCT Pub. Date: Jul. 25, 2013

(65) Prior Publication Data
US 2014/0249252 A1    Sep. 4, 2014

(30) Foreign Application Priority Data

Jan. 19, 2012 (JP) ................. 2012-009216

(51) Int. Cl.
| C08J 3/20 | (2006.01) |
| C08J 3/22 | (2006.01) |
| C08K 3/00 | (2006.01) |
| C08J 3/205 | (2006.01) |

(52) U.S. Cl.
CPC .............. *C08J 3/22* (2013.01); *C08J 3/2053* (2013.01); *C08K 3/0033* (2013.01); *C08J 2321/02* (2013.01)

(58) Field of Classification Search
CPC ..... C08J 3/22; C08J 3/226; C08J 3/18; C08K 3/0033; C08L 7/02
See application file for complete search history.

(56) References Cited

U.S. PATENT DOCUMENTS

| 6,040,364 | A | 3/2000 | Mabry et al. |
| 6,048,923 | A | 4/2000 | Mabry et al. |
| 6,075,084 | A | 6/2000 | Mabry et al. |
| 6,413,478 | B1 | 7/2002 | Mabry et al. |
| 8,053,496 | B1* | 11/2011 | Minouchi ................ C08J 3/226 |
| | | | 523/351 |
| 8,586,651 | B2* | 11/2013 | Wang .................... C08C 1/15 |
| | | | 523/323 |
| 2002/0016404 | A1 | 2/2002 | Mabry et al. |
| 2002/0151649 | A1* | 10/2002 | Enami .................. C08L 23/10 |
| | | | 525/88 |
| 2003/0195276 | A1 | 10/2003 | Mabry et al. |
| 2003/0203992 | A1 | 10/2003 | Mabry et al. |
| 2006/0111475 | A1 | 5/2006 | Mabry et al. |
| 2011/0021664 | A1 | 1/2011 | Wang et al. |
| 2014/0045989 | A1 | 2/2014 | Wang et al. |
| 2015/0247011 | A1* | 9/2015 | Nomura ................. B29B 13/06 |
| | | | 524/526 |

FOREIGN PATENT DOCUMENTS

| CN | 101981092 A | 2/2011 |
| JP | 2000-507892 A | 6/2000 |
| JP | 2010-65126 A | 3/2010 |
| JP | 2011-16874 A | 1/2011 |
| JP | 2011-511148 A | 4/2011 |
| JP | 2012-131943 A | 7/2012 |

OTHER PUBLICATIONS

"Conversion Energy" Retrieved on Apr. 6, 2017.*
Office Action dated Sep. 9, 2015, issued in counterpart German Application No. 112012005710.4, with English Translation. (7 pages).
International Search Report dated Nov. 27, 2012, issued in corresponding application No. PCT/JP2012/073832.
Office Action dated Feb. 2, 2015, issued in corresponding Chinese application No. 2012800675561, with English translation. (14 pages).
Notification of Transmittal of Translation of the International Preliminary Report on Patentability (Form PCT/IB/338) of International Application No. PCT/JP2012/073832, mailing date of Jul. 31, 2014, with Forms PCT/IB/373 and PCT/ISA/237.
Office Action dated Jul. 17, 2015, issued in corresponding Japanese Patent Application No. 2012-009216 (8 pages) (English Language Translation Included).

* cited by examiner

*Primary Examiner* — Hannah Pak
(74) *Attorney, Agent, or Firm* — Westerman, Hattori, Daniels & Adrian, LLP

(57) ABSTRACT

A method for producing a rubber wet masterbatch includes a solidifying step of mixing a slurry solution containing a filler and a dispersing solvent with a rubber latex solution, and solidifying the resultant mixture to produce a filler-containing rubber solidified product, a dehydrating step of using a first uniaxial extruder to dehydrate the filler-containing rubber solidified product while the solidified product is heated into the range of 100 to 180° C., thereby producing a rubber wet masterbatch, and a drying plasticizing step of using a second uniaxial extruder to plasticize the rubber wet masterbatch while the masterbatch is heated into the range of 120 to 180 C, thereby producing the rubber wet masterbatch further decreased in water content by percentage. The method does not have cooling step between the dehydrating step and the drying plasticizing step.

10 Claims, No Drawings

METHOD FOR PRODUCING RUBBER WET MASTERBATCH, RUBBER WET MASTERBATCH, AND RUBBER COMPOSITION INCLUDING RUBBER WET MASTERBATCH

TECHNICAL FIELD

The present invention relates to a method for producing a rubber wet masterbatch obtained by use of at least a filler, a dispersing solvent, and a rubber latex solution as raw materials; a rubber wet masterbatch; and a rubber composition including the rubber wet masterbatch. The present invention relates particularly to a method for producing a rubber wet masterbatch excellent in filler dispersibility therein, and improved in rubber properties, such as tearing resistance and stress property in its high-strain region; a rubber wet masterbatch produced by this production method; and a rubber composition including the rubber wet masterbatch.

BACKGROUND ART

Hitherto, it has been known in the rubber industry that when a rubber composition containing a filler such as carbon black is produced, a rubber wet masterbatch is used to improve the composition in workability and in filler dispersibility therein. This is a substance obtained by mixing a filler and a dispersing solvent beforehand with each other at a predetermined ratio, dispersing the filler into the dispersing solvent by mechanical force, mixing the resultant filler-containing slurry solution with a rubber latex solution in a liquid phase, adding a solidifier such as an acid thereto to produce a solidified product, and then collecting and drying the product. In the case of using a rubber wet masterbatch, a rubber composition is obtained which is better in filler dispersibility therein, and rubber properties such as workability and reinforceability than in the case of using a rubber dry masterbatch obtained by mixing a filler and a rubber with each other in a solid phase. The use of such a rubber composition as a raw material makes it possible to produce, for example, a pneumatic tire decreased in rolling resistance and excellent in fatigue resistance, or some other rubber product.

In the above-mentioned rubber wet masterbatch-producing method, a manner for removing water originating from the dispersing solvent and the rubber latex solution from the filler-containing rubber solidified product obtained through the solidifying step may be a manner of subjecting the slurry to solid-liquid separation, for example, in a filtrating or centrifuging manner, and then using any mixer to knead the filler-containing rubber solidified product while the product is heated, thereby dehydrating the product. This dehydrating method allows the water content by percentage to be lower in the rubber wet masterbatch obtained by the dehydration as the heating temperature for the kneading is made higher. However, in a case where the calorie and/or mechanical energy applied at the time of the dehydration becomes large, the resultant rubber wet masterbatch undergoes the cleavage of its polymer molecular chains, and other inconveniences. Thus, a rubber composition to be finally obtained therefrom may be deteriorated in vulcanized rubber properties.

Patent Document 1 listed below describes a production method of drying and kneading a rubber wet masterbatch containing a rubber component and a filler while a biaxial extruder is used as a first kneader, and then using a second kneader, a Banbury mixer, to mix a rubbery chemical therewith, thereby producing a rubbery-chemical-containing masterbatch. However, in this production method, the biaxial extruder is used to dry and knead the filler-containing rubber solidified product to produce the rubber wet masterbatch; thus, a large mechanical energy comes to be applied to the rubber wet masterbatch so that the rubber component tends to be deteriorated. Accordingly, a vulcanized rubber to be finally obtained therefrom tends to be deteriorated in tearing resistance and high-strain-region stress property.

Patent Document 2 listed below describes a method for producing an elastomer composite material, including: performing the step of masticating a rubber solidified product obtained through a dehydrating step while a mechanical energy of at least about 0.3 MJ/kg (about 249 W/kg) is applied thereto; and performing a subsequent step of masticating the resultant additionally while a mechanical energy of about 0.9 MJ/kg (about 83 W/kg) is applied thereto. However, this production method also tends to make the mechanical energy applied to the rubber wet masterbatch large to deteriorate the rubber component. Accordingly, a vulcanized rubber to be finally obtained therefrom tends to be deteriorated in tearing resistance and high-strain-region stress property.

PRIOR ART DOCUMENTS

Patent Documents

Patent Document 1: JP-A-2010-65126
Patent Document 2: JP-A-2011-511148

SUMMARY OF THE INVENTION

Problems to be Solved by the Invention

In the light of the actual situation, the present invention has been made. An object thereof is to provide a method for producing a rubber wet masterbatch excellent in filler dispersibility therein, and improved in rubber properties, such as tearing resistance and high-strain-region stress property; a rubber wet masterbatch produced by this production method; and a rubber composition including the rubber wet masterbatch.

Means for Solving the Problems

The object can be attained by the present invention described in the following. That is, the present invention relates to a method for producing a rubber wet masterbatch obtained by use of at least a filler, a dispersing solvent, and a rubber latex solution as raw materials, including a solidifying step of mixing a slurry solution containing the filler and the dispersing solvent with the rubber latex solution, and solidifying the resultant mixture to produce a filler-containing rubber solidified product, a dehydrating step of using a first uniaxial extruder to dehydrate the filler-containing rubber solidified product while the solidified product is heated into the range of 100 to 180° C., thereby producing a rubber wet masterbatch, and a drying plasticizing step of using a second uniaxial extruder to plasticize the rubber wet masterbatch while the masterbatch is heated into the range of 120 to 180° C., thereby producing the rubber wet masterbatch further decreased in water content by percentage, the method having no cooling step between the dehydrating step and the drying plasticizing step.

According to this production method, a slurry solution containing a filler and a dispersing solvent is mixed with a rubber latex solution, and solidifying the mixture to produce a filler-containing rubber solidified product (solidifying step), and this rubber solidified product is dehydrated and dried to produce a rubber wet masterbatch. Thus, the filler is excellent in dispersibility in the rubber wet masterbatch. Moreover, a first uniaxial extruder is used to dehydrate the filler-containing rubber solidified product while the solidified product is heated into the range of 100 to 180° C., thereby producing the rubber wet masterbatch (dehydrating step), so that while the calorie and mechanical energy applied thereto are restrained as much as possible, the resultant rubber wet masterbatch can be effectively decreased in water content by percentage. Furthermore, a second uniaxial extruder is used to plasticize the rubber wet masterbatch while the masterbatch is heated into the range of 120 to 180° C. (drying plasticizing step), thereby making it possible to produce the rubber wet masterbatch further decreased in water content by percentage and hardly rubber-deteriorated.

For example, when the rubber wet masterbatch after the dehydrating step has been cooled to room temperature before the drying plasticizing step, a larger quantity of calorie and mechanical energy are applied to the rubber wet masterbatch in the drying plasticizing step. However, the above-mentioned production method has no cooling step between the dehydrating step and the drying plasticizing step. Thus, the resultant rubber wet masterbatch can be effectively decreased in water content by percentage while the calorie and mechanical energy applied to the rubber wet masterbatch are restrained as much as possible. A manner for preventing the rubber wet masterbatch form being cooled between the dehydrating step and the drying plasticizing step may be, for example, a manner of connecting the first uniaxial extruder and second uniaxial extruder to each other. The cooling step referred to in the present invention denotes, for example, a step in which the rubber wet masterbatch after the dehydrating step is cooled to a temperature of 40° C. or lower; and denotes, in a broader sense, a step in which the masterbatch is cooled to a temperature of 60° C. or lower.

It is preferred in the method for producing the rubber wet masterbatch that the water content by percentage of the rubber wet masterbatch obtained through the dehydrating step is from 1 to 10%. It is also preferred that the water content by percentage of the rubber wet masterbatch obtained through the drying plasticizing step is 0.9% or less. In the present invention, a drying process extending over the two stages (the dehydrating step and the drying plasticizing step) is performed, and further the water content by percentage after each of the steps is set in the range, thereby making it possible to decrease the rubber wet masterbatch effectively in water content by percentage while a vulcanized rubber to be finally obtained therefrom is certainly prevented from being rubber-deteriorated.

It is preferred in the method for producing the rubber wet masterbatch that in the drying plasticizing step, a mechanical energy of 70 W/kg or less is applied to the rubber wet masterbatch inside the second uniaxial extruder. This case makes it possible to decrease the rubber wet masterbatch effectively in water content by percentage while the final vulcanized rubber is more certainly prevented from being rubber-deteriorated.

It is preferred in the method for producing the rubber wet masterbatch that when the rubber wet masterbatch is plasticized in the drying plasticizing step, an anti-aging agent is added and blended thereinto. This case makes it possible to disperse the anti-aging agent more evenly in the rubber wet masterbatch, so that the final vulcanized rubber can be prevented from being rubber-deteriorated with a higher certainty. In the rubber wet masterbatch that has undergone the dehydrating step, the water content by percentage has been lowered. Thus, in the drying plasticizing step, the outflow of the anti-aging agent is hardly caused, following the volatilization of water.

It is preferred that the method for producing the rubber wet masterbatch includes, after the drying plasticizing step, a shaping plasticizing step of using a mixer further to plasticize the rubber wet masterbatch. It is more preferred that in the shaping plasticizing step, the mechanical energy applied to the rubber wet masterbatch in the mixer is 70 W/kg or less. This case makes it possible to decrease the rubber wet masterbatch more effectively in water content by percentage while the final vulcanized rubber is certainly prevented from being rubber-deteriorated. Examples of the mixer include an open roll, and a uniaxial extruder.

It is preferred in the method for producing the rubber wet masterbatch that the solidifying step includes step (I) of adding, when the filler is dispersed into the dispersing solvent, at least one portion of the rubber latex solution thereto, thereby producing the slurry solution that is a slurry solution containing the filler to which rubber latex particles adhere, step (II) of mixing the slurry solution with the rest of the rubber latex solution, thereby producing the rubber latex solution containing the rubber-latex-particle-adhering filler, and step (III) of solidifying the rubber latex solution containing the rubber-latex-particle-adhering filler to produce the filler-containing rubber solidified product. This case makes it possible to produce a rubber wet masterbatch in which the filler is evenly dispersed and the filler is restrained from re-flocculating with time, and that is usable as a raw material for a vulcanized rubber excellent in low-thermogenic performance, endurance and rubber strength.

It is preferred in the method for producing the rubber wet masterbatch that when the filler is dispersed in the dispersing solvent in step (I) of producing the slurry solution, an anti-aging agent is added and blended thereinto to produce the filler-containing slurry solution in which the anti-aging agent adheres to the rubber latex particles or the filler. This embodiment makes it possible to cause the anti-aging agent to adhere onto the rubber latex particles and/or the filler. In particular, therefore, in the slurry solution, the rubber latex particles adhering to the filler can be prevented from being deteriorated so that the rubber wet masterbatch to be finally obtained can be improved in endurance.

The present invention relates to a rubber wet masterbatch produced by the production method of any one of the above-mentioned embodiments, particularly to a rubber composition containing the above-mentioned rubber wet masterbatch. Vulcanized rubbers obtained by vulcanizing this rubber wet masterbatch and this rubber composition, respectively, are excellent in filler dispersibility therein, and exhibit a low-thermogenic performance. Additionally, the rubbers are excellent in tearing resistance, high-strain-region stress property, and others.

MODE FOR CARRYING OUT THE INVENTION

The method according to the present invention for producing a rubber wet masterbatch includes at least a solidifying step, a dehydrating step, and a drying plasticizing step. Hereinafter, each of the steps will be described.

Solidifying Step:

The solidifying step is a step of mixing a slurry solution containing a filler and a dispersing solvent with a rubber latex solution, and solidifying the mixture to produce a filler-containing rubber solidified product. The solidifying step in particular preferably includes step (I) of adding, when the filler is dispersed into the dispersing solvent, at least one portion of the rubber latex solution thereto, thereby producing the slurry solution that is a slurry solution containing the filler to which rubber latex particles adhere, step (II) of mixing the slurry solution with the rest of the rubber latex solution, thereby producing the rubber latex solution containing the rubber-latex-particle-adhering filler, and step (III) of solidifying the rubber latex solution containing the rubber-latex-particle-adhering filler to produce the filler-containing rubber solidified product.

In the present invention, the filler denotes an inorganic filler used ordinarily in the rubber industry, such as carbon black, silica, clay, talc, calcium carbonate, magnesium carbonate, or aluminum hydroxide. Of these inorganic fillers, carbon black is in particular preferably usable in The present invention.

The species of carbon black may be any carbon black species usable in an ordinary rubber industry, such as SAF, ISAF, HAF, FEF or GPF, or may be any electroconductive carbon black species such as acetylene black or Ketjenblack. The carbon black species may be a granulated carbon black species which has been granulated considering the handleability thereof in an ordinary rubber industry, or a non-granulated carbon black species.

The dispersing solvent is in particular preferably water, and may be, for example, water containing an organic solvent.

The rubber latex solution may be a natural rubber latex solution, or a synthetic rubber latex solution.

The natural rubber latex solution is a natural product produced by metabolism of a plant, and is in particular preferably a natural rubber/water system solution, in which a dispersing solvent therein is water. The number-average molecular weight of a natural rubber in the natural rubber latex used in the present invention is preferably 2,000,000 or more, more preferably 2,500,000 or more. The synthetic rubber latex solution may be a solution produced by emulsion-polymerizing, for example, styrene-butadiene rubber, butadiene rubber, nitrile rubber, or chloroprene rubber.

The following will describe a preferred example of the solidifying step on the basis of an example using carbon black as the filler, and a natural rubber latex solution as the rubber latex solution. This case makes it possible to produce a rubber wet masterbatch which is very high in carbon black dispersibility therein and is to give a vulcanized rubber further improved in low-thermogenic performance, endurance and rubber strength. As the natural rubber latex, a concentrated latex, a fresh latex called a field latex, and the like are usable without any discrimination.

(1) Step (I)

Step (I) is a step of adding, when carbon black is dispersed into a dispersing solvent, at least one portion of a natural rubber latex solution thereto, thereby producing a slurry solution containing carbon black to which natural rubber latex particles adhere. It is allowable to mix the natural rubber latex solution beforehand with the dispersing solvent, and then add carbon black thereto and disperse carbon black therein. It is also allowable to add carbon black into the dispersing solvent, and next disperse carbon black in the dispersing solvent while the natural rubber latex solution is added thereto at a predetermined adding speed; or add carbon black into the dispersing solvent, and next disperse carbon black in the dispersing solvent while multiple divided fractions of the natural rubber latex solution are added thereto, the fractions being constant in volume. By dispersing carbon black into the dispersing solvent in the state that the natural rubber latex solution is present, the just-above mentioned slurry solution can be produced, which contains the natural-rubber-latex-particle-adhering carbon black. The amount of the natural rubber latex solution added in step (I) is, for example, from 0.075 to 12% by mass of the whole of the used natural rubber latex solution (the total of the amounts added in step (I) and step (II)).

In step (I), in the added natural rubber latex solution, the ratio by mass of the solid (rubber) to carbon black therein is preferably from 0.25 to 15%, more preferably from 0.5 to 6% by mass. The solid (rubber) concentration in the added natural rubber latex solution is preferably from 0.2 to 5% by mass, more preferably from 0.25 to 1.5% by mass. In these cases, a rubber wet masterbatch can be produced which is heightened in carbon black dispersibility therein while the natural rubber latex particles are certainly adhered onto carbon black.

The method for mixing carbon black with the dispersing solvent in the presence of the natural rubber latex solution in step (I) may be a method of using an ordinary disperser, such as a high-shearing mixer, a High Shear Mixer, a homo-mixer, a ball mill, a bead mill, a high-pressure homogenizer, an ultrasonic homogenizer or a colloid mill, to disperse carbon black.

The "high-shearing mixer" denotes a mixer having a rotor rotatable at a high velocity and a fixed stator in which the rotor is rotated in the state that a precise clearance is set between the rotor and the stator, whereby a high-shearing effect is obtained. In order to generate such a high-shearing effect, it is preferred to set the clearance between the rotor and the stator, and the peripheral velocity of the rotor to 0.8 mm or less, and 5 m/s or more, respectively. Such a high-shearing mixer may be a commercially available product. An example thereof is a product "High Shear Mixer" manufactured by Silverson.

In the case of mixing carbon black and the dispersing solvent with each other in the presence of the natural rubber latex solution in the present invention to produce the slurry solution containing the natural-rubber-latex-particle-adhering carbon black, a surfactant may be added thereto to improve carbon black in dispersibility. The surfactant may be a surfactant known in the rubber industry. Examples thereof include nonionic surfactants, anionic surfactants, cationic surfactants, and amphoteric surfactants. Instead of the surfactant or in addition to the surfactant, an alcohol such as ethanol may be used. However, it is feared that the use of the surfactant is to deteriorate rubber properties of a vulcanized rubber to be finally obtained. Thus, the blend amount of the surfactant is preferably 2 parts or less by mass, more preferably 1 part or less by mass for 100 parts by mass of the solid (rubber) in the natural rubber latex solution. It is preferred to use substantially no surfactant. In order to restrain the deterioration of the solid (rubber) in the natural rubber latex solution in steps (I) and (II), an anti-aging agent may be added thereto. The anti-aging agent may be an anti-aging agent known in the rubber industry. Examples thereof include amine type, phenol type, organic phosphite type, and thioether type agents.

About the natural-rubber-latex-particle-adhering carbon black in the slurry solution produced in step (I), the 90% volume particle size (μm) ("D90") is preferably 31 μm or more, more preferably 35 μm or more. In this case, carbon black in the slurry solution is excellent in dispersibility, and can be prevented from re-flocculating. Thus, the slurry solution is excellent in storage stability, and further the final vulcanized rubber is also to be excellent in low-thermogenic performance, endurance and rubber strength. In the present invention, the D90 of the natural-rubber-latex-particle-adhering carbon black means a value obtained by making a measurement about carbon black plus the adhering natural rubber latex particles.

(2) Step (II)

Step (II) is a step of mixing the slurry solution with the rest of the natural rubber latex solution, thereby producing a rubber latex solution containing the natural-rubber-latex-particle-adhering carbon black. The method for mixing the slurry solution and the rest of the natural rubber latex solution with each other in a liquid phase is not particularly limited, and may be a method of using an ordinary disperser, such as a high-shearing mixer, a High Shear Mixer, a homo-mixer, a ball mill, a bead mill, a high-pressure homogenizer, an ultrasonic homogenizer or a colloid mill, to mix the two. At the time of the mixing, the whole of the mixing system, such as the disperser, may be optionally heated.

About the rest of the natural rubber latex solution, the solid (rubber) concentration therein is preferably higher than that in the natural rubber latex solution added in step (I) when the period and labor for drying in next step (III) are considered. Specifically, the solid (rubber) concentration is preferably from 10 to 60% by mass, more preferably from 20 to 30% by mass.

(3) Step (III)

Step (III) is a step of solidifying the rubber latex solution containing the natural-rubber-latex-particle-adhering carbon black to produce a filler-containing rubber solidified product. The method for the solidification may be, for example, a method of incorporating a solidifier into the rubber latex solution containing the natural-rubber-latex-particle-adhering carbon black to solidify the latex solution.

The solidifier used in the solidifying step may be an acid, such as formic acid or sulfuric acid, or a salt, such as sodium chloride, that is commonly used for solidifying a rubber latex solution.

In the filler-containing rubber solidified product obtained through step (III), it is preferred about the ratio between the rubber component and the filler that the filler is contained in an amount of 30 to 80 parts by mass for 100 parts by mass of the rubber (solid). This case makes it possible to produce a rubber wet masterbatch which is finally improved, with a good balance, in filler dispersibility therein, and in low-thermogenic performance and endurance to be obtained when the masterbatch is made into a vulcanized rubber.

The filler-containing rubber solidified product obtained through the solidifying step is present in the water originating from the dispersing solvent and the rubber latex. Thus, before subjected to a dehydrating step, the solidified product may be subjected to solid-liquid separation by, for example, a filtrating method or centrifuging method, to decrease the water content by percentage therein into the range of 40 to 60%. Thereafter, the dehydrating step may be performed.

Dehydrating Step:

The dehydrating step is a step of using a first uniaxial extruder to dehydrate the filler-containing rubber solidified product while the solidified product is heated into the range of 100 to 180° C., thereby producing a rubber wet masterbatch. The first uniaxial extruder may be any uniaxial extruder usable in the ordinary rubber industry. The barrel diameter (D), the barrel length (L), and further the ratio of the barrel length to the barrel diameter (L/D) may be set at will. The gap width (slit width) between the inner wall of the barrel and its screw is preferably from 0.1 to 0.9 mm. In the present invention, it is preferred to use a uniaxial extruder having no pin portions projected inward from the barrel inner wall of a discharging port side region (expander region) of the uniaxial extruder. If the expander region has pin portions, a high shearing force acts onto the rubber component passing by the pin portions so that polymeric chains in the rubber component are cleaved. Thus, deterioration of the rubber component easily advances. As a result, the vulcanized rubber to be finally obtained tends to be deteriorated in tearing resistance and high-strain-region stress property.

In the dehydrating step, the set temperature of the inside of the barrel of the first uniaxial extruder (the heating temperature for the filler-containing rubber solidified product) is preferably from 160 to 220° C., more preferably from 180 to 200° C. to decrease the water content by percentage effectively in the resultant rubber wet masterbatch while the calorie and mechanical energy applied thereto are restrained as much as possible.

In the rubber wet masterbatch obtained through the dehydrating step, the water content by percentage is set into a range preferably from 1 to 10%, more preferably from 1 to 8%.

Drying Plasticizing Step:

The drying plasticizing step is a step of using a second uniaxial extruder to plasticize the rubber wet masterbatch while the masterbatch is heated into the range of 120 to 180° C., thereby producing a rubber wet masterbatch further decreased in water content by percentage. The second uniaxial extruder may be equivalent to the first uniaxial extruder. As in the case with the first uniaxial extruder, the second uniaxial extruder preferably has no pin portions in the barrel inner wall of its expander region.

In the drying plasticizing step, the set temperature of the inside of the barrel of the second uniaxial extruder (the heating temperature for the rubber wet masterbatch) is preferably from 160 to 220° C., more preferably from 160 to 200° C. to decrease the water content by percentage effectively in the resultant rubber wet masterbatch while the calorie and mechanical energy applied thereto are restrained as much as possible.

In the drying plasticizing step, it is preferred that the mechanical energy applied to the rubber wet masterbatch in the second uniaxial extruder is 70 W/kg or less because this case finally gives, from the rubber wet masterbatch as a raw material, a vulcanized rubber excellent in tearing resistance and high-strain-region stress property.

In the rubber wet masterbatch obtained through the drying plasticizing step, the water content by percentage is preferably 0.9% or less.

When the rubber wet masterbatch is plasticized in the drying plasticizing step, the addition and incorporation of an anti-aging agent thereinto make it possible to disperse the anti-aging agent more evenly in the rubber wet masterbatch. As a result, the final vulcanized rubber can be favorably prevented, with a higher certainty, from being rubber-deteriorated. The anti-aging agent may be an anti-aging agent ordinarily used for rubbers, and examples thereof include aromatic amine type anti-aging agents, amine-ketone type anti-aging agents, monophenolic type anti-aging agents, bisphenolic type anti-aging agents, polyphenolic type anti-aging agents, dithiocarbamic acid salt type anti-aging agents, and thiourea type anti-aging agents. These may be used alone or in the form of an appropriate mixture. The content of the anti-aging agent (s) is more preferably from 0.3 to 3 parts by mass, even more preferably from 0.5 to 1.5 parts by mass for 100 parts by mass of the rubber component (solid) in the rubber wet masterbatch.

The production method according to the present invention has no cooling step between the dehydrating step and the drying plasticizing step. It is therefore possible to decrease the water content by percentage effectively in the resultant rubber wet masterbatch while the calorie and mechanical energy applied to the rubber wet masterbatch are restrained as much as possible. The method for preventing the rubber wet masterbatch from being cooled between the dehydrating step and the drying plasticizing step may be, for example, a method of connecting the first and second uniaxial extruders to each other through a connecting tool, such as a heatable cylinder having a short barrel length, or a method of connecting the first and second uniaxial extruders directly to each other. In order to prevent the rubber wet masterbatch from being cooled, the following temperature is set preferably to 40° C. or higher, more preferably to 60° C. or higher, in particular preferably to 120° C. or higher: the temperature of the rubber wet masterbatch before the masterbatch is charged from the first uniaxial extruder into the connecting tool; or the temperature of the rubber wet masterbatch before the masterbatch is charged into the second uniaxial extruder when the first and second uniaxial extruders are connected directly to each other.

Shaping Plasticizing Step:

The rubber wet masterbatch-producing method according to the present invention may include, after the drying plasticizing step, a shaping plasticizing step of using a mixer further to plasticize the rubber wet masterbatch. The mixer is preferably, for example, an open roll or a uniaxial extruder. In the shaping plasticizing step also, it is preferred that the mechanical energy applied to the rubber wet masterbatch in the mixer is 70 W/kg or less since this case is to make the vulcanized rubber to be finally obtained from the rubber wet masterbatch as a raw material excellent in tearing resistance and high-strain-region stress property. The shaping machine may be a baler. In the drying plasticizing step, the water content by percentage in the rubber wet masterbatch has been sufficiently decreased; accordingly, the water content by percentage in the rubber wet masterbatch obtained through the shaping plasticizing step may be about 0.9% or less as in the case with the rubber wet masterbatch obtained through the drying plasticizing step.

In the rubber wet masterbatch-producing method according to the present invention, subsequently to the drying plasticizing step or the shaping plasticizing step, a rubber composition can be produced by incorporating various blending agents into the rubber wet masterbatch by performing a masticating step, a kneading step and a vulcanization-related blending agent kneading step.

Masticating Step:

The step is a step of using a mixing/dispersing device to knead the rubber component alone, or the rubber wet masterbatch which contains only the filler such as carbon black so as not to contain any other blending agent (the rubber wet masterbatch containing, when the anti-aging agent is added and blended thereinto in the drying plasticizing step, the anti-aging agent). Through the masticating step, rubber molecular chains in the rubber component are cleaved while the molecular chains are made uniform in length. Additionally, the rubber component is decreased in elasticity to be heightened in plasticity. The rubber wet masterbatch becomes good in rubber-kneading workability after this step. The mixing/dispersing device usable in the masticating step may be, for example, a gear-engaging type Banbury mixer, a tangential line type Banbury mixer, or a kneader. In particular, a gear-engaging type Banbury mixer is preferred.

Kneading Step:

The step is a step of charging one or more blending agents other than any vulcanization-related blending agent into the rubber wet masterbatch obtained through the drying plasticizing step, the shaping plasticizing step, or the masticating step, and then using the mixing/dispersing device to knead all the components. Examples of the blending agent (s) include stearic acid, zinc flower, an anti-aging agent, silica, a silane coupling agent, a softener such as wax or oil, and a working aid. When the blending agent (s) is/are mixed with the rubber component in the kneading step, for example, the following advantages are produced: a rubber product after the masterbatch is vulcanized is to be heightened in strength; the rubber is made good in rubber-kneading workability; and the rubber is prevented from being deteriorated by radicals generated by the cleavage of the rubber molecular chains. In the kneading step also, for example, a gear-engaging type Banbury mixer, a tangential line type Banbury mixer, or a kneader is usable. In particular, the use of a gear-engaging type Banbury mixer is preferred.

Vulcanization-Related Blending Agent Kneading Step:

One or more vulcanization-related blending agents, such as a vulcanizing agent, for example, sulfur, and/or a vulcanization promoter, are charged into the rubber composition obtained through the kneading step, and then the entire components are kneaded and mixed with each other. When the rubber composition obtained through the vulcanization-related blending agent kneading step is heated to a predetermined temperature or higher, the vulcanizing agent in the rubber composition reacts with the rubber molecules so that crosslinkage structures are formed between the rubber molecules. Thus, the molecules are made into a three-dimensional network to give rubber elasticity to the rubber composition.

It is sufficient that the sulfur is a sulfur for ordinary rubbers. Examples thereof include powdery sulfur, precipitated sulfur, insoluble sulfur, and highly dispersible sulfur. The sulfur content in the rubber composition according to the present invention is preferably from 0.3 to 6 parts by mass for 100 parts by mass of the rubber component. If the sulfur content is less than 0.3 parts by mass, the vulcanized rubber is short in crosslinkage density to be lowered in rubber strength and others. If the sulfur content is more than 6.5 parts by mass, the vulcanized rubber is deteriorated, particularly, in both of heat resistance and endurance. In order to ensure the rubber strength of the vulcanized rubber satisfactorily and further improve the heat resistance and the endurance thereof, the sulfur content is more preferably from 1.5 to 5.5 parts by mass for 100 parts by mass of the rubber component.

The vulcanization promoter may be a vulcanization promoter commonly used for rubber vulcanization. Examples thereof include sulfenamide type vulcanization promoters, thiuram type vulcanization promoters, thiazole type vulcanization promoters, thiourea type vulcanization promoters, guanidine type vulcanization promoters, and dithiocarbamic acid salt type vulcanization promoters. These may be used alone or in the form of an appropriate mixture. The content of the vulcanization promoter(s) is more preferably from 1 to 5 parts by mass, even more preferably from 1.5 to 4 parts by mass for 100 parts by mass of the rubber component.

EXAMPLES

Hereinafter, this invention will be more specifically described by demonstrating examples thereof. Raw materials and devices used therein are as follows.

Used Materials
a) Fillers:
   Carbon black "N330": "SEAST 3" (manufactured by Tokai Carbon Co., Ltd.),
   Carbon black "N110": "SEAST 9" (manufactured by Tokai Carbon Co., Ltd.), and
   Carbon black "N550": "SEAST SO" (manufactured by Tokai Carbon Co., Ltd.);
b) Dispersing solvent: Water;
c) Rubber latex solutions:
   Natural rubber concentrated latex solution, manufactured by REGITEX Co., Ltd. (DRC (dry rubber content)=60%), mass-average molecular weight (Mw)=236,000; and
   Natural rubber fresh latex solution (NR field latex), manufactured by Golden Hope (DRC=31.2%), mass-average molecular weight (Mw)=232,000;
d) Solidifier: Formic acid (adjusted into a pH of 1.2 by diluting a 10% solution of a first class 85%-concentration agent) (manufactured by Nacalai Tesque, Inc.);
e) Zinc flower:
   "No. 1 zinc flower" (manufactured by Mitsui Mining & Smelting Co., Ltd.); and
   "No. 3 zinc flower" (manufactured by Mitsui Mining & Smelting Co., Ltd.);
f) Stearic acid (manufactured by NOF Corporation);
g) Wax (manufactured by Nippon Seiro Co., Ltd.);
h) Anti-aging agent:
N-phenyl-N'-(1,3-dimethylbutyl)-p-phenylenediamine
   "6PPD" (manufactured by Monsanto);
i) Sulfur:
   Sulfur (manufactured by Tsurumi Chemical Industry Co., Ltd.); and
   Insoluble sulfur: "OT-20" (manufactured by Akzo Nobel);
j) Vulcanization promoters:
   "CBS" (manufactured by Sanshin Chemical Industry Co., Ltd.), and
   N,N-dicyclohexylbenzothiazole-2-sulfenamide, "NOC-CELER DZ" (manufactured by Ouchi Shinko Chemical Industry Co., Ltd.);
k) Boron-containing organic acid cobalt: "MANOBOND C680C" (manufactured by OMG);
l) Resorcin-alkylphenol-formalin resin: "SUMIKANOL 620" (manufactured by Sumitomo Chemical Co., Ltd.);
m) Hexamethoxymethylmelamine: "CYLETS 963L" (manufactured by Mitsui Cytex, Ltd.); and
n) Additional rubber: High-cis polybutadiene rubber, "BR150L" (manufactured by Ube Industries, Ltd.).

Example 1

Rubber wet masterbatches were each produced by the following method:
Solidifying Step:
   Carbon black was added into a diluted latex solution in water which has a concentration adjusted to 0.5% by mass, so as to give a carbon black concentration of 5% by mass. A device, ROBOMIX, manufactured by PRIMIX Corporation was used to disperse carbon black therein (ROBOMIX conditions: rotation at 9000 rpm for 30 minutes) to produce a slurry solution containing carbon black to which natural rubber latex particles adhered (step (I)).
   To the slurry solution produced in step (I), which contained the natural-rubber-latex-particle-adhering carbon black, was added the rest of the natural rubber latex solution (the solid (rubber) concentration therein was adjusted to 25% by mass by the addition of water) to adjust the total of the solid (rubber) content therein and that in the natural rubber latex solution used in step (I) to 100 parts by mass. Next, a mixer for household use, model SM-L56, manufactured by Sanyo Electric Co., Ltd. was used to mix these components with each other (mixer conditions: rotation at 11300 rpm for 30 minutes) to produce a carbon black-containing natural rubber latex solution (step (II)). In the carbon black-containing natural rubber latex solution, 60 parts by mass of carbon black were contained for 100 parts by mass of the rubber component (solid).
   A 10%-by-mass solution of formic acid in water as a solidifier was added to the carbon black-containing natural rubber latex solution produced in step (II) until the pH of the whole turned to 4 (step (III)). A screen (φ2 punching, manufactured by Toyo Screen Kogyo Co., Ltd.) was used to remove water from the solution containing the resultant carbon-black-containing natural rubber solidified product, thereby producing a filler-containing rubber solidified product having a water content by percentage of 65.1%. In order to further decrease the water content by percentage, the solidified product may be centrifuged. An instrument, model H-22 (BS-030), manufactured by Kokusan Co., Ltd. may be used to subject the solidified product to solid-liquid separation (separating conditions: rotation at 29000 rpm for 10 minutes), thereby producing a filler-containing rubber solidified product having a water content by percentage of 46.2%.
Dehydrating Step and Drying Plasticizing Step:
   A first uniaxial extruder (product number: model V-02, manufactured by Suchiro EPM Corporation; barrel diameter: 90 mm; "barrel length"/"barrel diameter" (L/D)=8.6; and slit widths between the barrel and the screw: 0.7 mm, 0.5 mm, and 0.2 mm) was connected directly to a second uniaxial extruder (a uniaxial extruder identical with the first uniaxial extruder). The rubber wet masterbatch was subjected to the above-defined dehydrating step and drying plasticizing step while the following were each set into a value described in Table 1: the heating temperature, the mechanical energy applied to the rubber wet masterbatch (WMB) and the Moony viscosity in each of the steps; and the water content by percentage in the rubber wet masterbatch obtained through each of the steps. As shown in Table 1, the temperature change between the dehydrating step and the drying plasticizing step was only 30° C. Thus, it is understood that the present process had no cooling step between the dehydrating step and the drying plasticizing step. In Table 1 is shown the molecular weight (weight-average molecular weight) of the polymer in the rubber wet masterbatch after the drying plasticizing step. The weight-average molecular weight was measured by GPC (gel permeation chromatography), and was obtained in terms of that of standard polystyrene.

GPC device: LC-10A, manufactured by Shimadzu Corporation,

Columns: three columns "PLgel, 5 μm and 500 Å", "PLgel, 5 μm and 100 Å" and "PLgel, 5 μm and 50 Å" (manufactured by Polymer Laboratories) connected to each other were used, Flow rate: 1.0 mL/min, Concentration: 1.0 g/L, Injected volume: 40 μL, Column temperature: 40° C., and Eluent: tetrahydrofuran.

Examples 1 to 9, and Comparative Examples 1 to 3

Kneading Step, and Vulcanization-Related Blending Agent Kneading Step:

A B-type Banbury mixer (manufactured by Kobe Steel, Ltd.) was used to blend the following into 160 parts by mass of each of the rubber wet masterbatches (rubber component: 100 parts by mass, and carbon black: 60 parts by mass) obtained through the drying plasticizing step: 2 parts by mass of the anti-aging agent; 8 parts by mass of No. 3 zinc flower; 0.8 parts by mass of boron-containing organic acid cobalt; 2 parts by mass of resorcin-alkylphenol-formalin resin; and 4 parts by mass of hexamethoxymethylmelamine. Therewith were mixed 4.5 parts by mass of insoluble sulfur as one of the vulcanization-related blending agents, and 1 part by mass of the vulcanization promoter DZ to produce a rubber composition. This rubber composition was vulcanized at 150° C. for 30 minutes. In this way, each vulcanized rubber was produced.

Example 10 and Comparative Example 4

A B-type Banbury mixer (manufactured by Kobe Steel, Ltd.) was used to produce each rubber composition in the same way as in Example 1 except that the following were blended into 150 parts by mass of the rubber wet masterbatch concerned (rubber component: 100 parts by mass, and carbon black: 50 parts by mass) obtained through the drying plasticizing step: 20 parts by mass of the additional rubber (high-cis polybutadiene rubber); 2 parts by mass of stearic acid; 1 part by mass of the anti-aging agent; 3 parts by mass of No. 1 zinc flower; and 1 part by mass of the wax; and further the vulcanization-related blending agents in the vulcanization-related blending agent kneading step were changed to 2 parts by mass of sulfur manufactured by Tsurumi Chemical Industry Co., Ltd., and 1 part by mass of the vulcanization promoter CBS. The rubber composition was vulcanized at 150° C. for 30 minutes. In this way, each vulcanized rubber was produced.

Example 11 and Comparative Example 5

A B-type Banbury mixer (manufactured by Kobe Steel, Ltd.) was used to produce each rubber composition in the same way as in Example 1 except that the following were blended into 170 parts by mass of the rubber wet masterbatch concerned (rubber component: 100 parts by mass, and carbon black: 70 parts by mass) obtained through the drying plasticizing step: 1 part by mass of stearic acid; 3 parts by mass of No. 1 zinc flower; and 1 part by mass of the wax; and further the vulcanization-related blending agents in the vulcanization-related blending agent kneading step were changed to 2 parts by mass of sulfur manufactured by Tsurumi Chemical Industry Co., Ltd., and 1 part by mass of the vulcanization promoter CBS. The rubber composition was vulcanized at 150° C. for 30 minutes. In this way, each vulcanized rubber was produced.

The resultant vulcanized rubbers were evaluated under conditions described below. The results are shown in Table 1.

Rubber Strength (300% Modulus) of Each of Vulcanized Rubbers:

A JIS No. 3 dumbbell was used to measure the 300% modulus of each of the produced samples according to JIS-K 6251. It is denoted that as the numerical value thereof is higher, the rubber composition is further prevented from being rubber-deteriorated when produced, so that the composition is better in rubber property.

Tearing Resistance:

The tearing resistance of each of the produced vulcanized rubbers was evaluated according to JIS K6252. In the evaluation, about each of Examples 1 to 8 and Comparative Examples 2 to 3, the index of the value thereof is shown which is a relative value obtained when the value of Comparative Example 1 is regarded as 100; about Example 9, the index obtained when the value of Comparative Example 4 is regarded as 100; and about Example 10, the index obtained when the value of Comparative Example 5 is regarded as 100. It is denoted that as the numerical value thereof is higher, the vulcanized rubber is better in tearing resistance.

Examples 2 and 3 and Comparative Example 2

Each rubber wet masterbatch, and each rubber composition were produced in the same way as in Example 1 except that the heating temperature in the drying plasticizing step was changed to a value shown in Table 1. The evaluation results are shown in Table 1.

Example 4

A rubber wet masterbatch and a rubber composition were produced in the same way as in Example 1 except that subsequently to the drying plasticizing step, an open roll (10-inch roll (manufactured by Kansai Roll Co., Ltd.)) was used to subject the masterbatch through this drying plasticizing step to the above-defined shaping plasticizing step, thereby shaping the masterbatch into sheets each having a thickness of 10 to 40 mm. The evaluation results are shown in Table 1.

Examples 5 and 8

Each rubber wet masterbatch and each rubber composition were produced in the same way as in Example 1 except that subsequently to the drying plasticizing step, a uniaxial extruder (identical with the first uniaxial extruder) and a baler (XLB-D (manufactured by Qingdao Xianqjie Rubber Machinery Co., Ltd.) were used to subject the masterbatch through this drying plasticizing step to the above-defined shaping plasticizing step, thereby shaping the masterbatch into the form of bales (lumps) each having a thickness of 40 to 200 mm. The evaluation results are shown in Table 1.

Examples 6 and 7

Each rubber wet masterbatch and each rubber composition were produced in the same way as in Example 5 except that in the drying plasticizing step, the anti-aging agent was added in an amount shown in Table 1. The evaluation results are shown in Table 1.

Comparative Example 1

A rubber wet masterbatch and a rubber composition were produced in the same way as in Example 1 except that a B-type Banbury mixer (manufactured by Kobe Steel, Ltd.) was used to perform the above-defined drying plasticizing step, and further an open roll (10-inch roll (manufactured by Kansai Roll Co., Ltd.)) was used to perform the above-defined shaping plasticizing step. The evaluation results are shown in Table 1.

Comparative Example 3

A rubber wet masterbatch and a rubber composition were produced in the same way as in Example 1 except that in the dehydrating step and the drying plasticizing step, the following extruders were used, respectively: a pin-fitted uniaxial extruder having 8 pin portions (6 mm) projected inward from the barrel inner wall of its expander region (product number: model V-02, manufactured by Suchiro EPM Corporation; barrel diameter: 90 mm; "barrel length"/"barrel diameter" (L/D)=8.6; and slit widths between the barrel and the screw: 0.7 mm, 0.5 mm, and 0.2 mm); and a biaxial extruder (product number: KTX-37, manufactured by Kobe Steel, Ltd.; barrel diameter: 37 mm; and "barrel length"/"barrel diameter" (L/D)=30). The evaluation results are shown in Table 1.

Comparative Examples 4 and 5

Each rubber wet masterbatch and each rubber composition were produced in the same way as in Comparative Example 1 except that the shaping plasticizing step was not performed. The evaluation results are shown in Table 1.

TABLE 1

| | Comparative Example 1 | Comparative Example 2 | Comparative Example 3 | Example 1 |
|---|---|---|---|---|
| Solidifying step: | | | | |
| Carbon black species | N330 | N330 | N330 | N330 |
| Natural rubber latex | Fresh species | Fresh | Fresh | Fresh |
| [Water content by percentage] | 65.1 | 65.1 | 65.1 | 65.1 |
| Dehydrating step: | | | | |
| Used mixer | Uniaxial extruder | Uniaxial extruder | Uniaxial extruder[1)] | Uniaxial extruder |
| Heating temperature | 160° C. | 160° C. | 160° C. | 160° C. |
| Water content by percentage (%) | 5.00 | 5.00 | 4.87 | 5.00 |
| Mechanical energy (Wh/kg) applied to WMB | 93 | 93 | 140 | 93 |
| Drying plasticizing step: | | | | |
| Used mixer | BM[2)] | Uniaxial extruder | Biaxial extruder | Uniaxial extruder |
| Heating temperature | 160° C. | 110° C. | 160° C. | 130° C. |
| Water content by percentage (%) | 0.99 | 1.59 | 0.82 | 0.89 |
| Charged anti-aging agent | — | — | — | — |
| Mechanical energy (Wh/kg) applied to WMB | 320 | 73 | 341 | 65 |
| Mooney viscosity (ML1 + 4.0) | 147 | 208 | 119 | 192 |
| Shaping plasticizing step: | | | | |
| Used mixer | Open roll | — | — | — |
| Heating temperature | 40° C. | — | — | — |
| Water content by percentage (%) | 0.81 | — | — | — |
| Mechanical energy (Wh/kg) applied to WMB | 14 | — | — | — |
| Mooney viscosity (ML1 + 4.0) | 126 | — | — | — |
| Mass-average molecular weight ($\times 10^5$) of rubber polymer in WMB | 16.9 | 22 | 16.6 | 21.4 |
| <<Vulcanized rubber properties>> | | | | |
| Modulus (300%) (MPa) | 12.7 | 14.3 | 12.4 | 14.2 |
| Tearing resistance (Index) | 100 | 98 | 94 | 136 |

| | Example 2 | Example 3 | Example 4 | Example 5 |
|---|---|---|---|---|
| Solidifying step: | | | | |
| Carbon black species | N330 | N330 | N330 | N330 |
| Natural rubber latex | Fresh species | Fresh | Fresh | Fresh |
| [Water content by percentage] | 65.1 | 65.1 | 65.1 | 65.1 |
| Dehydrating step: | | | | |
| Used mixer | Uniaxial extruder | Uniaxial extruder | Uniaxial extruder | Uniaxial extruder |
| Heating temperature | 160° C. | 130° C. | 160° C. | 160° C. |
| Water content by percentage (%) | 5.00 | 7.23 | 5.00 | 5.00 |
| Mechanical energy (Wh/kg) applied to WMB | 93 | 78 | 93 | 93 |
| Drying plasticizing step: | | | | |
| Used mixer | Uniaxial extruder | Uniaxial extruder | Uniaxial extruder | Uniaxial extruder |
| Heating temperature | 160° C. | 180° C. | 160° C. | 160° C. |
| Water content by percentage (%) | 0.84 | 0.80 | 0.84 | 0.84 |

TABLE 1-continued

| | | | | |
|---|---|---|---|---|
| Charged anti-aging agent | — | — | — | — |
| Mechanical energy (Wh/kg) applied to WMB | 61 | 59 | 61 | 61 |
| Mooney viscosity (ML1 + 4.0) | 170 | 149 | 170 | 170 |
| Shaping plasticizing step: | | | | |
| Used mixer | — | — | Open roll | Uniaxial extruder |
| Heating temperature | — | — | 40° C. | 160° C. |
| Water content by percentage (%) | — | — | 0.82 | 0.83 |
| Mechanical energy (Wh/kg) applied to WMB | — | — | 48 | 63 |
| Mooney viscosity (ML1 + 4.0) | — | — | 154 | 137 |
| Mass-average molecular weight ($\times 10^5$) of rubber polymer in WMB | 21.3 | 21.1 | 20.6 | 20.5 |
| <<Vulcanized rubber properties>> | | | | |
| Modulus (300%) (MPa) | 14.2 | 14.1 | 14.1 | 14.2 |
| Tearing resistance (Index) | 136 | 133 | 129 | 126 |

| | Example 6 | Example 7 | Example 8 | Example 9 |
|---|---|---|---|---|
| Solidifying step: | | | | |
| Carbon black species | N330 | N330 | N330 | N330 |
| Natural rubber latex species | Fresh | Fresh | Fresh | Concentrated |
| [Water content by percentage] | 65.1 | 65.1 | 65.1 | 63.7 |
| Dehydrating step: | | | | |
| Used mixer | Uniaxial extruder | Uniaxial extruder | Uniaxial extruder | Uniaxial extruder |
| Heating temperature | 160° C. | 160° C. | 160° C. | 160° C. |
| Water content by percentage (%) | 5.00 | 5.00 | 5.00 | 6.41 |
| Mechanical energy (Wh/kg) applied to WMB | 93 | 93 | 93 | 99 |
| Drying plasticizing step: | | | | |
| Used mixer | Uniaxial extruder | Uniaxial extruder | Uniaxial extruder | Uniaxial extruder |
| Heating temperature | 160° C. | 160° C. | 160° C. | 160° C. |
| Water content by percentage (%) | 0.84 | 0.84 | 0.84 | 0.87 |
| Charged anti-aging agent | 1 part by mass[3] | 3 parts by mass[3] | — | — |
| Mechanical energy (Wh/kg) applied to WMB | 61 | 61 | 61 | 69 |
| Mooney viscosity (ML1 + 4.0) | 163 | 158 | 170 | 167 |
| Shaping plasticizing step: | | | | |
| Used mixer | Uniaxial extruder | Uniaxial extruder | Uniaxial extruder | — |
| Heating temperature | 160° C. | 160° C. | 110° C. | — |
| Water content by percentage (%) | 0.83 | 0.83 | 0.84 | — |
| Mechanical energy (Wh/kg) applied to WMB | 60 | 57 | 65 | — |
| Mooney viscosity (ML1 + 4.0) | 135 | 133 | 139 | — |
| Mass-average molecular weight ($\times 10^5$) of rubber polymer in WMB | 20.9 | 21.6 | 21.2 | 21.7 |
| <<Vulcanized rubber properties>> | | | | |
| Modulus (300%) (MPa) | 14.7 | 15.1 | 14.9 | 14.4 |
| Tearing resistance (Index) | 131 | 137 | 133 | 138 |

| | Comparative Example 4 | Example 10 | Comparative Example 5 | Example 11 |
|---|---|---|---|---|
| Solidifying step: | | | | |
| Carbon black species | N110 | N110 | N550 | N550 |
| Natural rubber latex species | Fresh | Fresh | Fresh | Fresh |
| [Water content by percentage] | 65.5 | 65.5 | 65.4 | 65.4 |
| Dehydrating step: | | | | |
| Used mixer | Uniaxial extruder | Uniaxial extruder | Uniaxial extruder | Uniaxial extruder |
| Heating temperature | 160° C. | 160° C. | 160° C. | 160° C. |

TABLE 1-continued

| | | | | |
|---|---|---|---|---|
| Water content by percentage (%) | 4.12 | 4.12 | 6.61 | TA 6.61 |
| Mechanical energy (Wh/kg) applied to WMB | 97 | 97 | 84 | 84 |
| Drying plasticizing step: | | | | |
| Used mixer | BM[2)] | Uniaxial extruder | BM[2)] | Uniaxial extruder |
| Heating temperature | 160° C. | 160° C. | 160° C. | 160° C. |
| Water content by percentage (%) | 0.81 | 0.83 | 1.03 | 0.86 |
| Charged anti-aging agent | — | — | — | — |
| Mechanical energy (Wh/kg) applied to WMB | 334 | 69 | 321 | 56 |
| Mooney viscosity (ML1 + 4.0) | 136 | 176 | 150 | 181 |
| Shaping plasticizing step: | | | | |
| Used mixer | — | — | — | — |
| Heating temperature | — | — | — | — |
| Water content by percentage (%) | — | — | — | — |
| Mechanical energy (Wh/kg) applied to WMB | — | — | — | — |
| Mooney viscosity (ML1 + 4.0) | — | — | — | — |
| Mass-average molecular weight ($\times 10^5$) of rubber polymer in WMB | 15.4 | 19.0 | 16.4 | 20.7 |
| <<Vulcanized rubber properties>> | | | | |
| Modulus (300%) (MPa) | 12.1 | 16.7 | 15.7 | 16.5 |
| Tearing resistance (Index) | 100 | 132 | 100 | 122 |

[1)]Pin-fitted uniaxial extruder
[2)]Banbury mixer
[3)]The number of parts by mass for 100 parts by mass of rubber component in WMB It is understood from the results in Table 1 that: the vulcanized rubber of the rubber composition obtained from the production method of each of Examples 1 to 10 was excellent in tearing resistance, and further the weight-average molecular weight thereof was kept and the modulus thereof was also high; thus, the vulcanized rubber was hardly rubber-deteriorated, and was excellent in rubber properties such as high-strain-region stress property.

The invention claimed is:

1. A method for producing a rubber wet masterbatch obtained by use of at least a filler, a dispersing solvent, and a rubber latex solution as raw materials,
   comprising a solidifying step of mixing a slurry solution containing the filler and the dispersing solvent with the rubber latex solution, and solidifying the resultant mixture to produce a filler-containing rubber solidified product,
   a dehydrating step of using a first uniaxial extruder to dehydrate the filler-containing rubber solidified product while the solidified product is heated into the range of 100 to 180° C., thereby producing a rubber wet masterbatch, and
   a drying plasticizing step of using a second uniaxial extruder to plasticize the rubber wet masterbatch while the rubber wet masterbatch is heated into the range of 120 to 180° C., thereby producing the rubber wet masterbatch further decreased in water content by percentage,
   the method having no cooling step between the dehydrating step and the drying plasticizing step,
   wherein in the drying plasticizing step, a mechanical energy of 70 Wh/kg or less is applied to the rubber wet masterbatch inside the second uniaxial extruder.

2. The method for producing the rubber wet masterbatch according to claim 1, wherein the water content by percentage of the rubber wet masterbatch obtained through the dehydrating step is from 1 to 10%.

3. The method for producing the rubber wet masterbatch according to claim 1, wherein the water content by percentage of the rubber wet masterbatch obtained through the drying plasticizing step is 0.9% or less.

4. The method for producing the rubber wet masterbatch according to claim 1, wherein the first uniaxial extruder and the second uniaxial extruder are connected to each other.

5. The method for producing the rubber wet masterbatch according to claim 1, wherein when the rubber wet masterbatch is plasticized in the drying plasticizing step, an anti-aging agent is added and blended thereinto.

6. The method for producing the rubber wet masterbatch according to claim 1, comprising, after the drying plasticizing step, a shaping plasticizing step of using a mixer further to plasticize the rubber wet masterbatch.

7. The method for producing the rubber wet masterbatch according to claim 6, wherein in the shaping plasticize step, a mechanical energy of 70 W/kg or less is applied to the rubber wet masterbatch inside the mixer.

8. The method for producing the rubber wet masterbatch according to claim 6, wherein the mixer is an open roll or a uniaxial extruder.

9. The method for producing the rubber wet masterbatch according to claim 1, wherein the solidifying step comprises step (I) of adding, when the filler is dispersed into the dispersing solvent, at least one portion of the rubber latex solution thereto, thereby producing the slurry solution that is a slurry solution containing the filler to which rubber latex particles adhere,
   step (II) of mixing the slurry solution with the rest of the rubber latex solution, thereby producing the rubber latex solution containing the rubber-latex-particle-adhering filler, and
   step (III) of solidifying the rubber latex solution containing the rubber-latex-particle-adhering filler to produce the filler-containing rubber solidified product.

10. The method for producing the rubber wet masterbatch according to claim 9, wherein when the filler is dispersed in the dispersing solvent in step (I) of producing the slurry solution, an anti-aging agent is added and blended thereinto.

* * * * *